May 13, 1958
U. E. BOWES
2,834,157
GLASS MELTING FURNACE
Filed Nov. 3, 1954
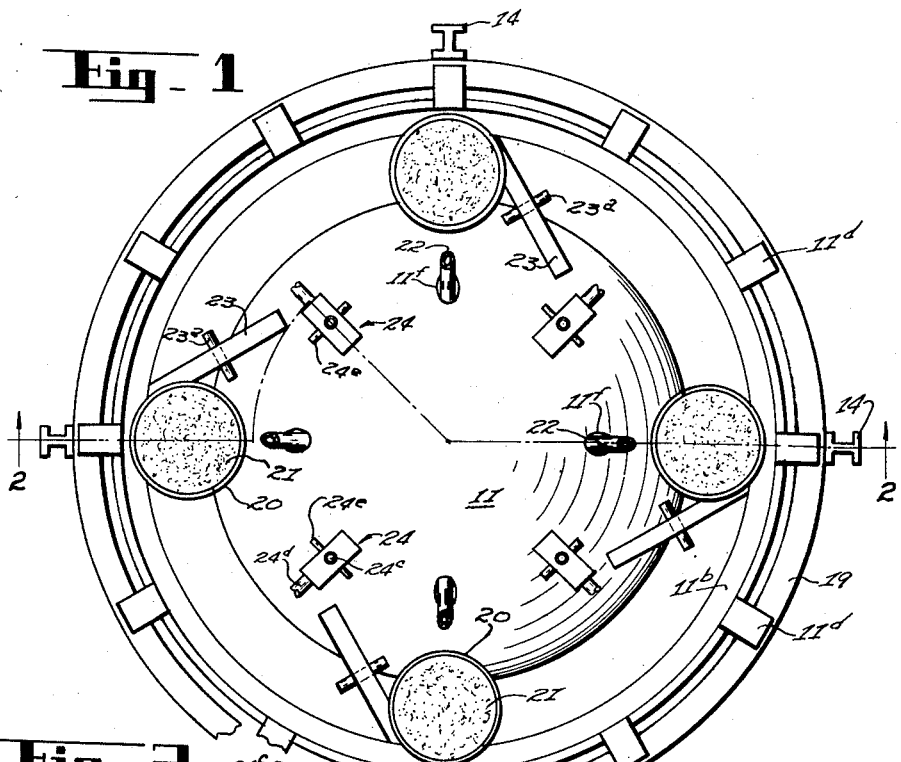
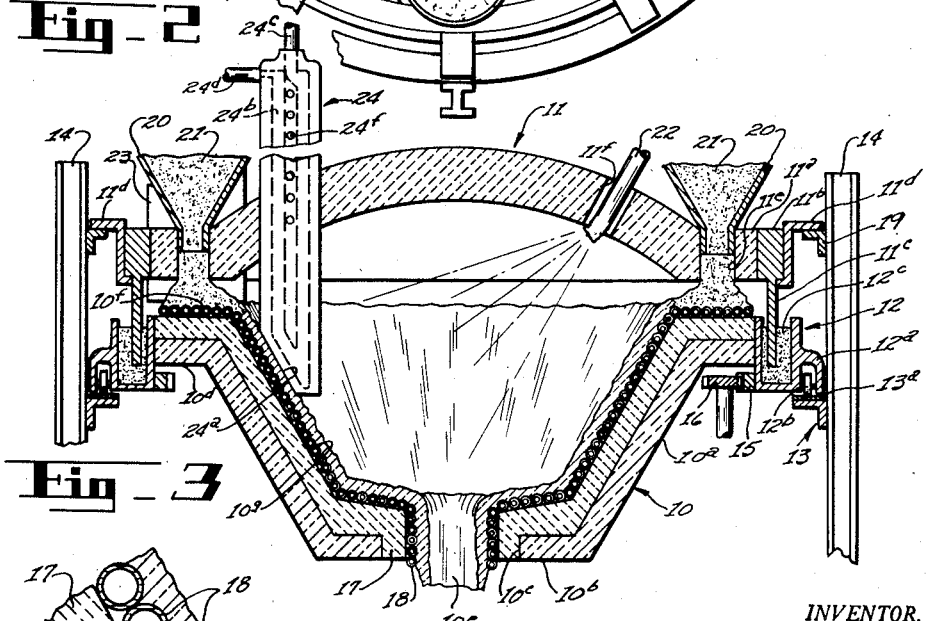
INVENTOR.
URBAN E. BOWES
BY
Schoch & Soubier
ATTORNEYS

United States Patent Office 2,834,157
Patented May 13, 1958

2,834,157

GLASS MELTING FURNACE

Urban E. Bowes, Perrysburg, Ohio, assignor to Owens-Illinois Glass Company, a corporation of Ohio Application November 3, 1954, Serial No. 466,596

3 Claims. (Cl. 49—53)

This invention relates to an improved furnace for glass melting.

In contrast to the conventional form of glass melting furnaces, wherein a horizontal tank of very substantial area and volume is employed to effect both the melting of the batch and the subsequent necessary refining operations, this invention contemplates the melting of the glass in a relatively small volume furnace and the subsequent refining of the glass in a conventionally-shaped pool with the necessary heat supplied more efficiently by electric currents. With the melting apparatus embodying this invention, the combustion of the oil or gas fuel may be accomplished at optimum efficiency within a relatively small volume enclosure so that the quantity of heat units liberated per cubic foot of combustion space is substantially increased. Since the maximum amount of heat required in a glass making operation is utilized in the melting step, a furnace embodying this invention will permit large-quantity production of glass with less fuel than has heretofore been possible.

Accordingly, it is an object of this invention to provide an improved glass-melting furnace.

A particular object of this invention is to provide an improved glass furnace, wherein the melting of the glass is accomplished in a relatively small volume compartment so designed as to produce optimum fuel combustion efficiency.

Still another object of this invention is to provide an improved refractory protecting cover structure for a glass-melting furnace.

The specific nature of this invention, as well as other objects and advantages thereof, will become apparent to those skilled in the art from the following detailed description, taken in conjunction with the annexed sheet of drawings on which, by way of preferred example only, is illustrated one embodiment of this invention.

On the drawings:

Figure 1 is a plan view of a glass-melting furnace constructed in accordance with this invention.

Figure 2 is a vertical sectional view taken along the multiplane line 2—2 of Figure 1.

Figure 3 is an enlarged-scale partial vertical sectional view of the furnace hearth wall.

As shown on the drawings:

The furnace embodying this invention essentially comprises an inverted frusto-conical hearth portion 10 and a cooperating dome-shaped cover 11. Hearth portion 10 may be formed by an inverted frusto-conical base member 10a having a flat-bottom portion 10b with an enlarged central aperture 10c formed therein. At the top of base member 10a, a horizontal flange portion 10d is provided which is rigidly secured to an annular channel-shaped ring 12. Ring 12 is filled with sand 12c, or similar material, for a purpose to be hereinafter described. At spaced intervals around the periphery of ring 12, brackets 12a are provided for the purpose of respectively journalling support rollers 12b. Rollers 12b ride in a track 13a formed on a supporting ring 13, which is, in turn, supported by a plurality of vertical support posts 14. The entire hearth 10 is preferably rotated about its axis, rolling on the rollers 12b, and driving power may be imparted to hearth 10 in any convenient fashion, for example, by provision of an internal ring gear 15 which is driven by a pinion 16.

A layer of conventional refractory material is applied to all internal surfaces of base member 10a. To protect such layer of refractory material from the excessive temperatures and corrosive conditions developed within the furnace, this invention provides a protective cover in the form of a layer of successive convolutions of metal tubes 18, all of the tubes being disposed in contiguous relationship so as to provide a substantially continuous cover of high thermal-conductivity properties. Since the tubes conform to the shape of base member 10a, it is apparent that the interior of the furnace constitutes an inverted frusto-conical configuration with a central discharge opening 10e in the bottom thereof, an annular flange 10F at the top and inclined side walls 10g disposed therebetween. If desired a suitable fluid coolant may be circulated through tubes 18.

As previously mentioned, the cover 11 which cooperates with hearth 10 is of dome-shaped configuration terminating at its periphery in a horizontal annular flange portion 11a. A sealing ring 11b is suitably secured to such periphery, and a depending annular flange 11c is provided on such sealing ring and projects into the ring of sand 12c that is retained by the annular channel member 12. Cover 11 is suspended on support posts 14 by virtue of the cooperation of a flange element 11d with brackets 19 secured to support posts 14. At spaced intervals around the periphery of crown 11, apertures 11e are provided within which are fitted funnel-shaped feeders 20, by which batch material, indicated at 21, may be supplied to the interior of the furnace, such batch material dropping upon the top flange portion 10f of the hearth. A plurality of spaced apertures 11f in the top of crown 11 permits the insertion of fuel nozzles 22, by which flames may be directed into the interior of the furnace, following a generally tangential path with respect to the walls of the furnace.

At spaced intervals around the periphery of crown 11, scraper blades 23 are vertically adjustably mounted, as by a pin 23a selectively insertable in one of a plurality of vertically spaced holes (not shown) which project through suitable apertures in crown 11 so that the bottom portions thereof may be adjustably positioned relative to the top portions of the hearth 10. As the hearth 10 is rotated, in the manner hereinbefore described, the scraper blades 23 will function to maintain a minimum thickness of batch on the top portion 10f of the hearth, scraping the excess batch over the edge into the frusto-conical interior of the furnace.

Additionally, it may be desirable to provide a plurality of fluid-cooled scraper elements 24, each of which is suitably mounted in the cover 11 and the lower portions of which are tapered, as indicated at 24a, to conform to the inclination of the sloped interior walls of the furnace. Blades 24 are provided with interior cooling passages 24b, which are supplied with cooling fluid through inlet pipes 24c and outlet pipes 24d. In this manner, it is assured that a continuous flow of batch material down the inclined interior walls 10g of the furnace will be produced. Vertical adjustment of scraper elements 24 may be obtained by selective insertion of a pin 24a in one of a plurality of holes 24b.

In the aforedescribed construction, the batch material is rapidly melted, due to the very high quantity of heat units liberated per cubic foot of combustion space. As the batch is melted and becomes less viscous, it flows by gravity down the inclined interior walls 10g of the hearth 10 to discharge through the central orifice 10e in the bottom of such hearth. Additionally, the combustion gases also discharge through such orifice and may be recaptured in conventional fashion for use in a regenerative heater, waste heat boiler, or the like, thus improving the overall heat efficiency.

With the interior surface of the furnace defined by the contiguous convolutions of metal tubes 18, a highly viscous layer of glass is retained in contact with such tubes 18 and, in effect, operates as an effective refractory to protect the actual walls of the furnace from the corrosive effects of the melting chamber. The high heat transfer characteristics of the contiguous convolutions of the metal tubes 18, plus fluid coolant, effectively prevent the establishment of localized hot spots, so that the layer of actual refractory 17 is effectively protected against any extreme localized heat. At the same time, the layer of highly viscous glass effectively protects the metal tubes 18 from the corrosive effects of the flames and less viscous glass. Thus, the amount of heat transferred to the metal tubes 18 is minimized, and a greater percentage of the heat generated within the furnace is retained in the fusing mass. The depending flange 11c, in cooperation with the annular channel of sand 12c, effectively retains the flames and combustion products within the interior of the furnace.

It is therefore apparent from the foregoing description that this invention provides a novel and highly efficient furnace construction for high tonnage melting of glass at higher fuel efficiency than has heretofore been accomplished.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. A glass melting furnace comprising a rotatable hearth of inverted frusto-conical interior configuration having a central discharge opening in the bottom thereof, means for rotating said hearth, a dome enclosing and sealing the top of said hearth, means for feeding batch to the upper periphery of said hearth, means responsive to the rotation of said hearth for distributing said batch around the top portions of said hearth, and means for tangentially directing heating flames within said hearth, whereby batch is melted in the upper regions of said hearth and flows down the walls thereof to said discharge opening, said discharge opening also constituting the exhaust port for combustion gases.

2. A glass melting furnace comprising a rotatable hearth of inverted frusto-conical interior configuration having a central discharge opening in the bottom thereof, means for rotating said hearth, said hearth having a generally horizontal top rim portion, means for feeding batch onto said rim portion, means responsive to the rotation of said hearth for distributing batch from said rim portion into the frusto-conical portion, a cover enclosing and sealing the top of said hearth, means for tangentially directing heating flames within said hearth, whereby batch is melted in the upper regions of said hearth and flows down the walls thereof to said discharge opening, a fluid cooled scraper movable in a rotary path relative to said frusto-conical portion to level the molten batch on said frusto-conical portion, said discharge opening also constituting the exhaust port for combustion gases, whereby maximum contact of the hot gases with the molten batch is maintained.

3. A glass melting furnace comprising a hearth of inverted frusto-conical interior configuration having a central discharge opening in the bottom thereof, said hearth having a generally horizontal top rim portion, a cover enclosing the top of said hearth, means traversing said cover for feeding batch onto said rim portion, means for relatively rotating said hearth and said cover, whereby batch is fed around the periphery of said rim portion, batch deflectors carried by said cover and operable to feed batch from said rim portion into said frusto-conical portion, means for tangentially directing heating flames within said hearth, whereby batch is melted in the upper regions of said hearth and flows down the walls thereof to said discharge opening, and a fluid cooled scraper carried by said cover and arranged to level the molten batch on said frusto-conical portion, said discharge opening constituting the exhaust port for combustion gases, whereby maximum contact of the hot gases with the molten batch is maintained.

References Cited in the file of this patent

UNITED STATES PATENTS

| | | |
|---|---|---|
| 682,365 | Mount | Sept. 10, 1901 |
| 1,889,510 | Amsler | Nov. 29, 1932 |
| 1,928,598 | Morton et al. | Sept. 26, 1933 |
| 2,455,907 | Slayter | Dec. 7, 1948 |